United States Patent [19]

Sunohara et al.

[11] Patent Number: 5,537,821
[45] Date of Patent: Jul. 23, 1996

[54] BOOSTER SHELL REINFORCING STRUCTURE IN A VACUUM BOOSTER

[75] Inventors: Hidemitu Sunohara; Toshiaki Mitani, both of Nagano, Japan

[73] Assignee: Nissin Kogyo Co., Ltd., Nagano, Japan

[21] Appl. No.: 380,537

[22] Filed: Jan. 23, 1995

[30] Foreign Application Priority Data

Jan. 25, 1994 [JP] Japan ................................. 6-006305

[51] Int. Cl.⁶ .............................. B60T 13/00; F15B 9/10
[52] U.S. Cl. ............................................. 60/547; 91/376 R
[58] Field of Search ............................. 91/369.1, 369.2, 91/376 R; 60/547.1; 92/86

[56] References Cited

U.S. PATENT DOCUMENTS

| | | | |
|---|---|---|---|
| 4,270,353 | 6/1981 | Thomas et al. | 60/547.1 |
| 4,428,274 | 1/1984 | Takeuchi et al. | 60/547.1 X |
| 4,475,337 | 10/1984 | Meynier | 60/547.1 |
| 4,671,167 | 6/1987 | Endo et al. | 91/376 R X |
| 4,756,232 | 7/1988 | Thioux et al. | 91/369.2 X |
| 4,785,628 | 11/1988 | Myers | 60/547.1 |
| 5,158,006 | 10/1992 | Gotoh et al. | 91/376 R X |

FOREIGN PATENT DOCUMENTS 0099450  6/1982  Japan ................................. 60/547.1

6021328  6/1985  Japan .

*Primary Examiner*—Hoang Nguyen
*Attorney, Agent, or Firm*—Whitham, Curtis, Whitham & McGinn

[57] ABSTRACT

In a booster shell reinforcing structure in a vacuum booster which makes a booster shell rigid enough to withstand the load applied thereto during operation and reduces the weight thereof, a reinforcement member includes an outer peripheral portion corresponding to a coupling angular portion between the flat portion and the tapered portion in a front shell half of the booster shell, being laid on an inner surface of the flat portion. The reinforcement member has a plurality of cuts formed in the outer peripheral portion at predetermined angular intervals so that each of the cuts is opened outside the reinforcement member and closed with inner edges of the cuts in the radial direction of the booster shell, and a plurality of main reinforcing portions which are located between the cuts. The front shell half includes a plurality of raised portions corresponding in position to the cuts, each of the raised portions having a sloped plate portion interposing between the cylindrical portion and the flat portion near the respective inner edges of the cuts, being substantially U-shaped in section perpendicular to the radial direction, and opening towards a master cylinder.

4 Claims, 2 Drawing Sheets

BOOSTER SHELL REINFORCING STRUCTURE IN A VACUUM BOOSTER

BACKGROUND OF THE INVENTION

The present invention relates to a booster shell reinforcing structure in a vacuum booster in which a booster shell provides: a front shell half having a circular flat portion, a tapered portion which is extended from the outer periphery of the circular flat plate portion and is made large in diameter backwardly, and a cylindrical portion extending backwardly from the rear edge of the tapered portion; and a rear shell half coupled to the rear end of the front shell half. In the vacuum booster, a reinforcement member has its outer peripheral portion corresponding to a coupling angular portion coupling between the flat plate portion and the tapered portion, the reinforcement member being laid on the inner surface of the flat plate portion. A flange of a master cylinder is joined to the outer surface of the flat plate portion with a plurality of bolts which are coupled to the reinforcement member and extend through the flat plate portion.

A conventional booster shell reinforcing structure of this type has been known, for instance, by Examined Japanese Utility Model Publication No. Sho. 60-21328.

In the front shell half, the flat plate portion and the tapered portion are coupled to each other with an angle formed between them; that is, there is provided a coupling angular portion coupling between the flat plate portion and the tapered portion. The coupling angular portion is liable to be bent back and forth by the load which is applied to the front wall of the front shell half during the operation of the vacuum booster and the master cylinder. In the conventional structure, the reinforcement member which is uniform in thickness and annular is laid on the inner surface of the flat plate portion in such a manner that its whole outer periphery corresponds in position to the coupling angular portion, whereby the whole peripheral portion of the coupling angular portion is increased in rigidity. The load applied to the front wall of the front shell half is greatest around the coupling bolts. Hence, the reinforcing of the front shell half can be sufficiently achieved by reinforcing only the portions of the front shell half with the reinforcement member which are around the coupling bolts.

However, in the conventional booster shell reinforcing structure, even the portions of the front shell half which are away from the coupling bolts are also reinforced with the reinforcement member large in thickness. This is not suitable for reduction of the weight of the vacuum booster.

SUMMARY OF THE INVENTION

The present invention has been made in view of the above-mentioned problems of the conventional structures. An object of the present invention is to provide a booster shell reinforcing structure in a vacuum booster which makes the booster shell rigid enough to withstand the load applied thereto during operation, and reduces the weight thereof.

In order to achieve the foregoing object of the present invention, the vacuum booster provides: a booster shell which includes a front shell half having a circular flat portion, a tapered portion extending from an outer periphery of the circular flat portion and made large in diameter backwardly, and a cylindrical portion extending backwardly from a rear edge of the tapered portion; and a rear shell half coupled to a rear end of the front shell half; a reinforcement member including an outer peripheral portion corresponding to a coupling angular portion coupling between the flat portion and the tapered portion, being laid on an inner surface of the flat portion, the reinforcement member having a plurality of cuts formed in the outer peripheral portion at predetermined angular intervals, each of the cuts being opened outside the reinforcement member in a radial direction of the booster shell and closed with inner edges of the cuts in the radial direction, and having a plurality of main reinforcing portions which are located between the cuts; a plurality of coupling members coupled to the main reinforcing portions of the reinforcement member and extending through the flat portion; and a master cylinder including a flange joined to an outer surface of the flat portion with the coupling members.

In the booster shell reinforcing structure, the front shell half includes a plurality of raised portions corresponding in position to the cuts, each of the raised portions having a sloped plate portion interposing between the cylindrical portion and the flat portion near the respective inner edges of the cuts, being substantially U-shaped in section perpendicular to the radial direction of the booster shell, and opening towards the master cylinder.

In the booster shell reinforcing structure, the outer peripheral portions of the main reinforcing portions of the reinforcement member have ribs which are protruded in an inward direction of the booster shell.

DETAILED DESCRIPTION OF THE PREFERRED EMBODIMENTS

One preferred embodiment of the present invention will be described with reference to the accompanying drawings.

Figure 1:
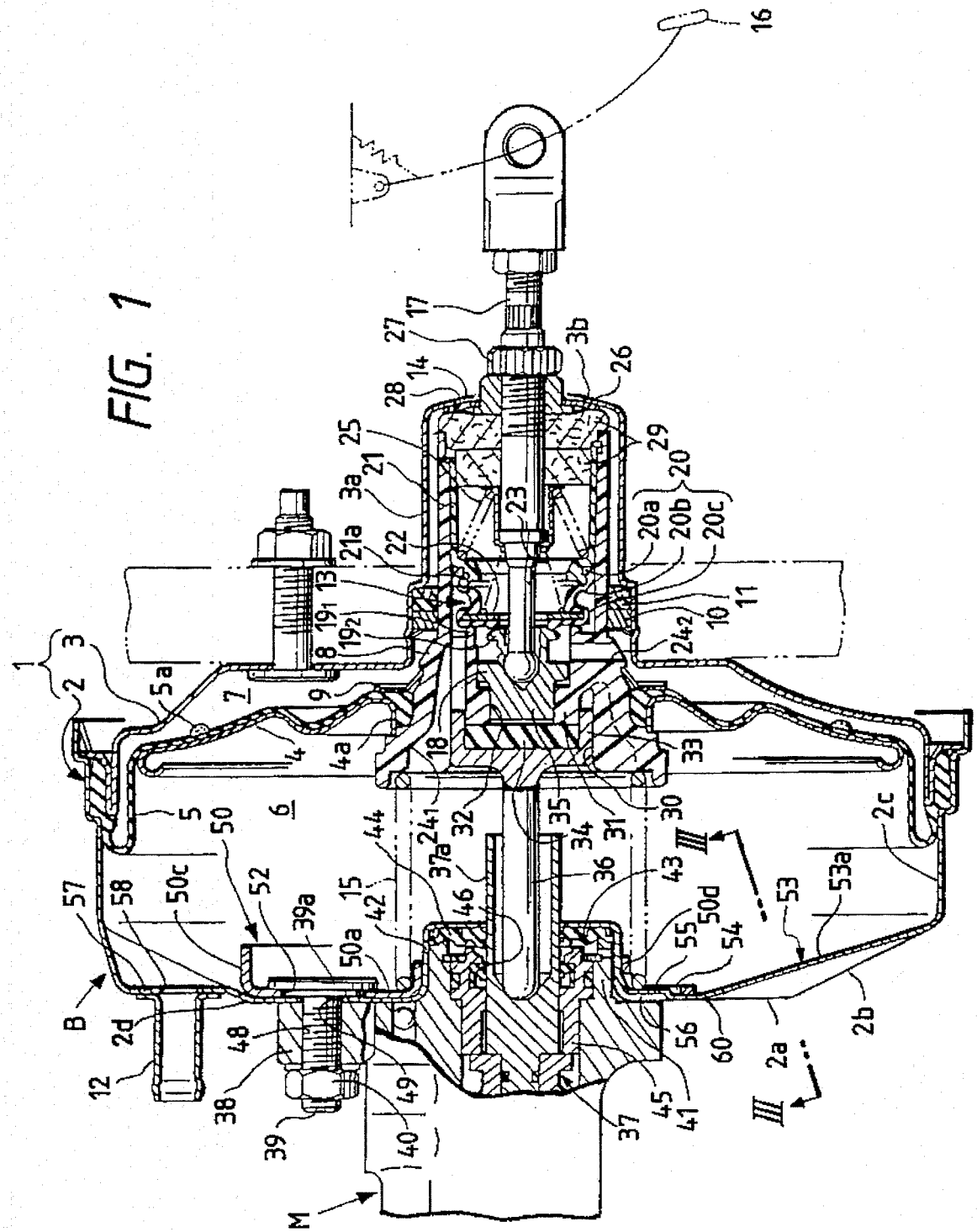
FIG. 1 is a longitudinal sectional side view showing a vacuum booster, which constitutes an embodiment of the present invention.

As shown in FIG. 1, a braking master cylinder M operated by the vacuum booster B is mounted on the front surface of the booster shell 1 of the vacuum booster B.

The booster shell 1 provides: a cup-shaped front shell half 2 which is made open backwardly; and a cup-shaped rear shell half 3 which is made open forwardly. The front end portion of the rear shell half 3 is joined to the rear end portion of the front shell half 2. Inside the booster shell 1, a booster piston 4 formed of steel plate, the rear surface of which being laid on a diaphragm 5, is provided in such a manner that it is movable back and forth, so that the inward of the booster shell 1 is divided into a front chamber, namely, a vacuum chamber 6 and a rear chamber, namely, a working chamber 7. The diaphragm 5 has inner and outer peripheral bead portions. The outer peripheral bead portion is fixedly held by the joint of the shell halves 2 and 3, and the inner peripheral bead portion together with the central boss 4a of the booster piston 4 is fitted on a cylindrical valve case 8, and is fixed with a stopper 9. The cylindrical valve case 8 is backwardly extended through the central boss 4a of the booster piston 4, and is slidably supported through a bush 10 and a sealing member 11 by a tube 3a which is extended rearwardly from the rear wall of the rear shell half 3 (hereinafter referred to as "a rearwardly extended tube 3a", when applicable).

The vacuum chamber 6 is kept communicated through a vacuum pressure introducing pipe 12 with a vacuum source, which is the suction manifold of an internal combustion engine, at all times. The working chamber 7 is communicated alternately with the vacuum chamber 6 and an atmospheric air inlet opening 14 provided at the end of the rearwardly extended tube 3a by means of a control valve 13 provided in the cylindrical valve case 8.

The booster piston 4 is kept urged backwardly; i.e., towards the working chamber 7 by a return spring 15 provided in the vacuum chamber 6; however, its backward movement is limited by the abutment of a number of protrusions 5a against the inner surface of the rear wall of the booster shell 1 which are arranged circularly on the rear surface of the diaphragm 5.

Inside the cylindrical valve case 8, an input rod 17 coupled to a brake pedal 16, and the aforementioned control valve 13 operated by the input rod 17 are provided as follows: That is, a valve piston 18 is slidably fitted in the front end portion of the cylindrical valve case 8, and the front end portion of the input rod 17 extended through the atmospheric air inlet opening 14 is swingably coupled to the valve piston 18. A first annular valve seat $19_1$ is formed in the inner surface of the cylindrical valve case 8, and a second annular valve seat $19_2$ is formed in the rear end face of the valve piston 18 in such a manner that it is surrounded by the first annular valve seat $19_1$. A valve member 20 cooperating with the two valve seats $19_1$ and $19_2$ is provided inside the cylindrical valve case 8. The valve member 20 is made of rubber, and it is in the form of a hollow cylinder having two open ends. The rear end portion of the valve member 20, namely, a bead-shaped base end portion 20a is fitted in an annular holding groove 21a formed in the outer surface of the front end portion of a holding tube 21 which is fitted in the cylindrical valve case 8, so that the base end portion 20a sealingly contacts the inner surface of the cylindrical valve case 8.

The valve member 20 includes a thin flexible portion 20b which is bent inwardly in the radial direction from the base end portion 20a; and a thick valve portion 20c extending from the front end of the flexible portion 20b. The valve portion 20c is confronted with the first and second annular valve seats $19_1$ and $19_2$. The valve portion 20c is moved back and forth in association with the deformation of the flexible portion 20b. When the valve portion 20c is moved forwardly, it is seated on the first and second annular valve seats $19_1$ and $19_2$; and when the valve portion 20c is moved backwardly, it is received by the front end of the holding tube 21.

An annular reinforcing member 22 is buried in the valve portion 20c. A valve spring 23 is compressedly interposed between the reinforcing member 22 and the input rod 17, to urge the valve portion 20c towards the first and second annular valve seats $19_1$ and $19_2$.

A first passage $24_1$ communicating with the vacuum chamber 6 is opened in the inner surface of the cylindrical valve case 8 outside the first annular valve seat $19_1$. A second passage $24_2$ communicating with the working chamber 7 is opened in the inner surface of the cylindrical valve case 8 inside the first annular valve seat $19_1$. The inside of the second annular valve seat $19_2$ is communicated through the hollows of the valve member 20 and the holding tube 21 with the atmospheric air inlet opening 14.

The valve member 20, the valve spring 23, and the first and second annular valve seats $19_1$ and $19_2$, form the aforementioned control valve 13.

A return spring 25 is compressedly interposed between the input rod 17 and the holding tube 21, to urge the input rod 17 backwardly. The backward movement of the input rod 17 is limited by the abutment of a stopper plate 26 against the inner surface of the end wall 3b of the rearwardly extended tube 3a. The stopper plate 26 is threadably engaged with the input rod 17 so that an engaging position on the input rod 17 is adjustable by turning the stopper plate 26, thus adjusting the backward movement of the input rod 17. The stopper plate 26 thus turned is fixed with a lock nut 27 which is threadably engaged with the input rod 17. The stopper plate 26 has a vent hole 28 so that it may not close the atmospheric air inlet opening 14.

Inside the cylindrical valve case 8, air filters 29 are mounted around the input rod 17 to filter the air introduced into the cylindrical valve case 8. The air filters 29 are suitably flexible so that they may not interfere with the relative displacement of the input rod 17 and the cylindrical valve case 8.

The cylindrical valve case 8 has a large diameter cylinder bore 30 which is opened forwardly, a cylindrical projection 31 extending from the bottom of the large diameter cylinder bore 30, and a small diameter cylinder bore 32 formed in the cylindrical projection 31. A cup-shaped output piston 33 is slidably fitted in the large diameter cylinder bore 30. With a resilient member 34 made of rubber or the like set in the output piston 33, the cylindrical projection 31 is slidably fitted in the output piston 33. A reaction piston 35 extended from the front end face of the above-described valve piston 18 is slidably fitted in the small diameter cylinder bore 32.

The aforementioned front shell half 2 provides: a circular flat plate portion 2a; a tapered portion 2b which is extended from the outer periphery of the circular flat plate portion 2a and is made large in diameter backwardly; and a cylindrical portion 2c which is extended backwardly from the rear edge of the tapered portion 2b. The flat plate portion 2a has a fitting cylindrical portion 42 at the center. The fitting cylindrical portion 42 has an annular receiving flange 43 as its bottom which is extended inwardly in the radial direction. On the other hand, the master cylinder M has a flange 38 and cylindrical boss 41 at the rear end. The flange 38 is extended outwardly in the radial direction, and the cylindrical boss 41 is located behind the flange 38 and is extended axially. The boss 41 is fitted in the fitting cylindrical portion 42 with a sealing member 44 set between the boss 41 and the flange 43. A bearing member 45 is liquid-tightly and fixedly fitted in the rear end portion of the master cylinder M. A piston rod 37a, which is coupled to a working piston 37 and is supported slidably in the axial direction by the bearing member 45, is extended through the aforementioned receiving flange 43 with a sealing member 44 mounted on the piston rod 37a. An annular sealing member 46 is fitted in the bearing member 45 in such a manner that it is in sliding contact with the piston rod 37a. An output rod 36 is projected from the front surface of the output piston 33. The output rod 36 is coupled to the above-described piston rod 37a.

A reinforcement member 50 is laid on the inner surface of the flat plate portion 2a of the front shell half 2. A plurality of coupling bolts 39, for instance, a pair of coupling bolts 39 are coupled to the reinforcement member 50 and are extended through the flat plate portion 2a. With the coupling bolts 39 and nuts 40, the flange 38 of the master cylinder M is joined to the outer surface of the flat plate portion 2a. A return spring 15 is interposed compressed between the reinforcement member 50 and the cylindrical valve case 8.

Figure 2:
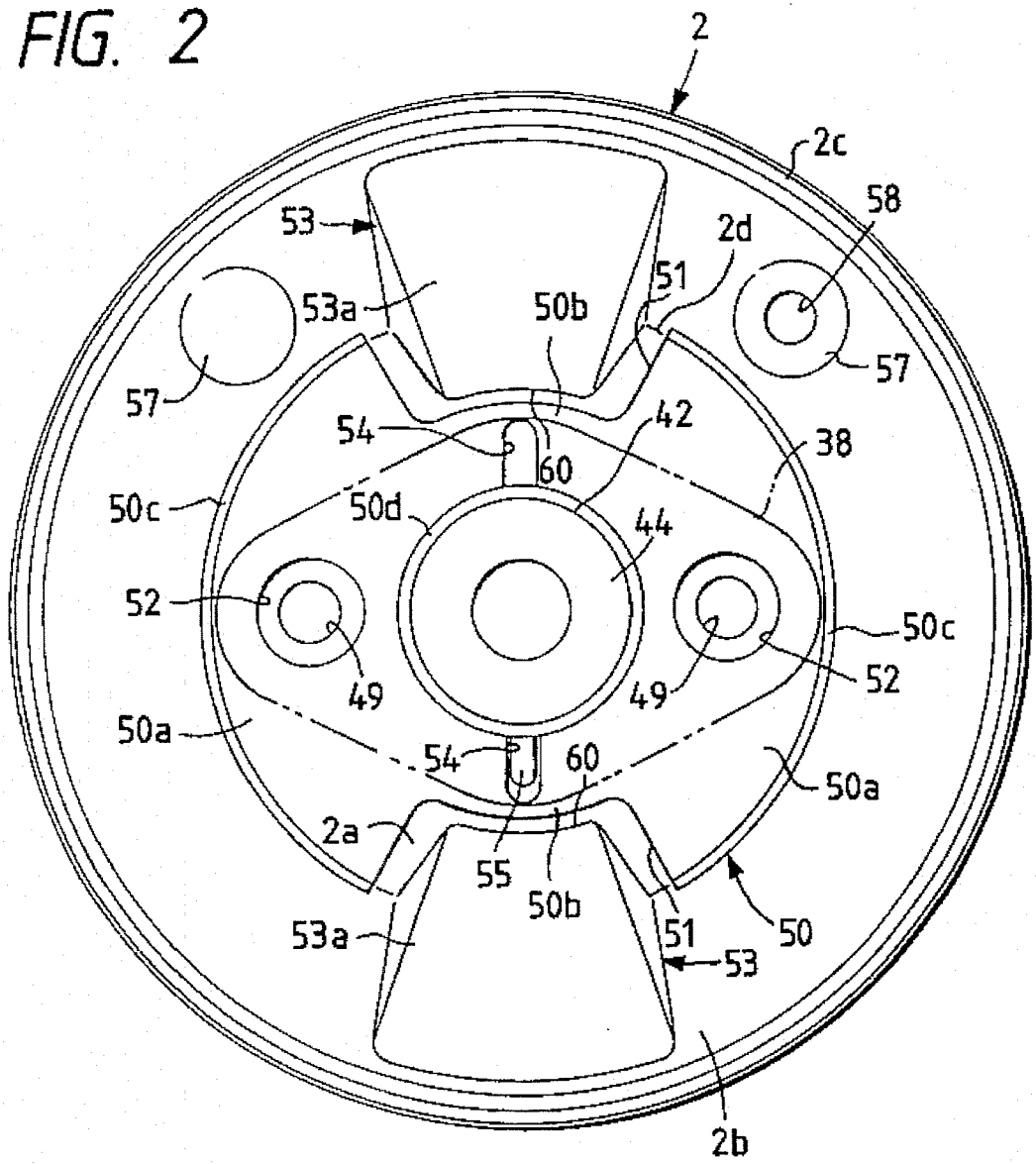
FIG. 2 is a front view of a front shell half, as viewed from inside, on which a reinforcement member is laid.

As shown in FIG. 2, the flange 38 is elongated along one straight diametrical line of the master cylinder M. A pair of through-holes 48 are formed in the flange 38 in such a manner that their axes are on the one straight diametrical line. Through-holes 49 are formed in the flat plate portion 2a of the front shell half 2 corresponding to those through-holes 48.

The reinforcement member 50 has a plurality of cuts 51 in the peripheral portion at equal angular intervals in which the cuts 51 are opened outside the reinforcement member 50 in the radial direction and closed with inner edges of the cuts 51 in the radial direction. In the embodiment as shown in FIG. 2, a pair of cuts 51 are formed in the peripheral portion of the reinforcement member, being located diametrically opposite to each other. The main reinforcing portions 50a of the reinforcement member 50, which are located between the cuts 51, have engaging holes 52 corresponding to the aforementioned through-holes 49, respectively. Each of the main reinforcing portions 50a is formed in a sectorial shape, being made large in arcuate length outwardly in the radial direction. The inner peripheral portions of the main reinforcing portions 50a and 50a are coupled to each other through arcuate coupling portions 50b and 50b which define the inner edges of the above-described cuts 51 and 51. The outer peripheral portions of the main reinforcing portions 50a and 50a are located substantially corresponding to the coupling angular portion 2d which is provided between the flat plate portion 2a and the tapered portion 2b of the front shell half 2. The outer peripheral portions of the main reinforcing portions include ribs 50c and 50c, respectively, which are protruded towards the inside of the booster shell 1 in the axial direction. A cylindrical portion 50d is extended from the inner periphery of the reinforcement member 50. The fitting cylindrical portion 42 of the front shell half 2 is fitted in the cylindrical portion 50d of the reinforcement member 50.

Figure 3:
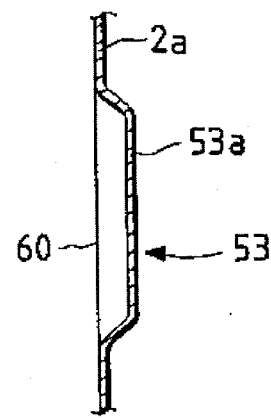
FIG. 3 is an enlarged sectional view taken along a line III—III in FIG. 1 of a raised portion 53 including a coupling angular portion 60 which couples a flat plate portion of the front shell half and sloped plate portions 53a of the raised portions 53.

The heads 39a of the coupling bolts 39 are engaged with the engaging holes 52 and set on the inner surface of the reinforcement member 50, and then joined air-tightly to the flat plate portion 2a by caulking or welding. Raised portions 53 and 53, which have sloped plate portions 53a and 53a interposing between the cylindrical portion 2c and the flat plate portion 2a, are formed in the portions of the front shell half 2 which correspond in position to the cuts 51 and 51 of the reinforcement member 50, in such a manner that they come in the cuts 51 and 51 of the reinforcement member 50. The coupling angular portions 60 coupling between the flat plate portion 2a and the sloped plate portions 53a and 53a are provided near the inner edges of the cuts 51 and 51, respectively. Each of the raised portions 53 is substantially U-shaped, open towards the master cylinder M, in the section which is perpendicular to the radial direction of the booster shell 1. FIG. 3 illustrates a cross-section of the above-mentioned raised portions 53 and further shows the coupling angular portions 60 in greater detail. FIG. 2 also illustrates the raised portions 53 and clearly illustrates the sloped plate portions 53a.

The coupling portions 50b and 50b of the reinforcement member 50 have a pair of accommodating holes 54 and 54 which are extended in the direction which is perpendicular to the straight line connecting between the engaging holes 52. When the reinforcement member 50 is laid on the inner surface of the flat plate portion 2a of the front shell half 2, a protrusion 55 which is provided on the inner surface of the lower end portion of the flat plate portion 2a is engaged with one of the accommodating holes 54 and 54. The protrusion 55 forms a discharging path 56 between the outer surface of the lower end portion of the boss 41 and the flange 38 as shown in FIG. 1. The discharging path 56 is used to quickly discharge the operating solution which leaks around the bearing member 45 and the piston rod 37a, thereby to prevent the entrance of the operating solution into the booster shell 1.

A pair of mounting seats 57 and 57 for mounting the vacuum pressure introducing pipe 12 are provided in the flat plate portion 2a of the front shell half 2 on both sides of one of the raised portions 53 and 53, respectively. One of the mounting seats 57 and 57 is selected for mounting the vacuum pressure introducing pipe 12. The mounting seat 57 thus selected has a communicating hole 58 which is communicated with the vacuum pressure introducing pipe 12.

Now, the operation of the vacuum booster B thus constructed will be described.

When the vacuum booster B is at rest, the control valve 13 is at the neutral position, so that the working chamber 7 is not communicated with the vacuum chamber 6 nor with the atmospheric air inlet opening 14. With the control valve 13 at the neutral position, the vacuum is supplied from the vacuum source through the vacuum pressure introducing pipe 12 into the vacuum chamber 6 and stored therein, whereas the vacuum suitably diluted by the air is held in the working chamber 7. Hence, a weak forward force is applied to the booster piston depending on the difference in pressure between the vacuum chamber 6 and the working chamber 7. The forward force being balanced with the elastic force of return spring 15, the booster piston 4 is held stopped slightly ahead of the backward movement limit.

When, under this condition, the brake pedal 16 is depressed, the input rod 17 and the valve piston 18 are moved forwardly. Initially, the booster piston 4 is at rest, and therefore the second annular valve seat $19_2$ is immediately spaced away from the valve portion 20c, so that the working chamber 7 is communicated with the atmospheric air inlet opening 14. As a result, the atmospheric air flows through the atmospheric air inlet opening 14, the second annular valve seat $19_2$ and the second passage $24_2$ into the working chamber 7, thus making the pressure in the working chamber 7 equal to the atmospheric pressure. As a result, a forward force is produced according to the difference in pressure between the vacuum chamber 6 and the working chamber 7, thus causing the booster piston 4 to move forwardly against the elastic force of the return spring 15. The forward movement of the booster piston 4 drives the working piston 37 of the master cylinder M forwardly through the output rod 36, so that the braking hydraulic pressure is produced by the master cylinder M.

During the braking operation, the valve piston 18 together with the input rod 17 is moved forwardly, thus abutting against the resilient member 34 through the reaction piston 35. In this operation, the resilient member 34, receiving the reaction of the output rod 36 through the output piston 33, is inflated towards the small diameter cylinder bore 32, so that part of the reaction is applied to the reaction piston 35. Therefore, the force is fed back to the brake pedal 16 through the valve piston 18 and the input rod 17, so that the operator can sense the magnitude of the output of the output rod 36; i.e., the magnitude of the braking force.

When the brake pedal is released, the input rod 17 together with the valve piston 18 is moved backwardly by the elastic force of the return spring 25, so that the second annular valve seat $19_2$ is engaged with the valve portion 20c while the valve portion 20c is greatly spaced away from the first annular valve seat $19_1$. As a result, the working chamber 7 is communicated through the first and second passages $24_1$ and $24_2$ with the vacuum chamber 6; that is, the difference in air pressure between chambers 6 and 7 is eliminated. Hence, the booster piston 4 is moved backwardly by the elastic force of the return spring 15, thus releasing the master cylinder M. When the input rod 17 is returned to the backward movement limit with the stopper plate 26 abutted against the end wall 3c of the rearwardly extended tube 3a, the booster piston 4 is returned to the backward movement limit with the protrusion 5a of the diaphragm 5 abutted against the rear wall of the booster shell 1, so that the first annular valve seat $19_1$ is engaged with the valve portion 20c while the cylindrical valve case 8 is slightly spaced from the second annular valve seat. As a result, the air is introduced through the second passage 24₂ into the working chamber 7. The introduction of air into the working chamber 7 results in the difference in air pressure between the two chambers 6 and 7, so that the booster piston 4 is slightly moved forwardly. As a result, the small gap between the second valves seat 19₂ and the valve portion 20c is eliminated; that is, the control valve 13 is set at the neutral position again. Thus, the vacuum diluted by the atmospheric air is held in the working chamber 7, and the vacuum booster B is at rest again as shown in FIG. 1.

When the vacuum booster B is in operation, load acts on the front shell half 1. The load is greatest around the coupling bolts 39. The reinforcement member 50 reinforcing the front shell half 2 has a plurality of cuts 51 in the peripheral portion at certain angular intervals, as described before. In the case of the embodiment, the reinforcement member 50 has a pair of cuts 51 and 51 in the peripheral portion in such a manner that the cuts 51 are diametrically opposite to each other. The coupling bolts 39 and 39 are coupled to the main reinforcing portions 50a and 50a which are located between the cuts 51 and 51. This indicates that the main reinforcing portions 50a and 50a reinforce the front shell half 2 mainly around the coupling bolts 39 and 39; that is, they mainly reinforce the portions of the front shell half 2 where the load is greatest. Thus, the front shell half 2 is sufficiently high in rigidity. The formation of the cuts 51 and 51 contributes to a reduction in weight of the reinforcement member 50, and accordingly of the vacuum booster B. The outer peripheral portions of the main reinforcing portions 50a and 50a have the ribs 50c and 50c corresponding to the coupling angular portion 2d coupling between the flat plate portion 2a and the tapered portion 2b, so that the coupling angular portion 2d which is liable to be bent is increased in rigidity.

As shown more clearly in FIGS. 2 and 3, the raised portions 53 and 53, which have the sloped plate portions 53a and 53a interposed between the cylindrical portion 2c and the flat plate portion 2a, are formed in the parts of the front shell half 2 which correspond to the cuts 51 and 51 of the reinforcement member 50, in such a manner that they come in the cuts 51 and 51 of the reinforcement member 50; and the coupling annular portions 60 coupling between the flat plate portion 2a and the sloped plate portions 53a extended from the cylindrical portion 2c are provided near the inner edges of the cuts 51 and 51; i.e., near the coupling portions 50b and 50b. Hence, the coupling angular portions 60 which are liable to be bent by a heavy load are increased in rigidity by the reinforcement member 50; that is, the raised portions 53 and 53 compensate for the decrease in rigidity due to the formation of the cuts 51 and 51.

As described above, in the booster shell reinforcing structure of the present invention, the cuts are formed in the peripheral portion of the reinforcement member at predetermined intervals in such a manner that each cut is open outside the reinforcement member in the radial direction and closed with the inner edge, and the coupling bolts are coupled to the main reinforcing portions of the reinforcement member, respectively, which are located between the cuts, and in the portions of the front shell half which correspond in position to the cuts, the raised portions are formed which have the sloped plate portions interposing between the cylindrical portion and the flat plate portion near the inner ends of the cuts, each of the raised portions being substantially U-shaped, open towards the master cylinder, in the section which is perpendicular to the radial direction of the booster shell. Hence, the reinforcement member is reduced in weight, and the portions of the front shell half on which a relatively great load acts, are sufficiently reinforced with the main reinforcing portions of the reinforcement member, and the raised portions compensate for the decrease in rigidity due to the formation of the cuts.

In the booster shell reinforcing structure, the outer peripheral portions of the main reinforcing portions of the reinforcement member have ribs which are protruded in the inward direction of the booster shell, which more effectively increase the rigidity of the portion between the flat plate portion and the tapered portion.

What is claimed is:

1. A vacuum booster comprising:
    a booster shell
        a front shell half having a circular flat portion, a tapered portion extending from an outer periphery of the circular flat portion and made large in diameter backwardly, and a cylindrical portion extending backwardly from a rear edge of the tapered portion; and
        a rear shell half coupled to a rear end of the front shell half;
    a reinforcement member including an outer peripheral portion corresponding to a coupling angular portion coupling between the flat portion and the tapered portion, being laid on an inner surface of the flat portion, the reinforcement member having a plurality of cuts formed in the outer peripheral portion at predetermined angular intervals, each of the cuts being opened outside the reinforcement member in a radial direction of the booster shell and closed with inner edges of the cuts in the radial direction, and having a plurality of main reinforcing portions which are located between the cuts;
    a plurality of coupling members coupled to the main reinforcing portions of the reinforcement member and extending through the flat portion; and
    a master cylinder including a flange joined to an outer surface of the flat portion with the coupling members.

2. The vacuum booster of claim 1, wherein the reinforcement member includes a rib protruded toward an inside of the booster shell in an axial direction thereof in the outer peripheral portion corresponding to the respective main reinforcing portions.

3. The vacuum booster of claim 1, wherein the front shell half includes a plurality of raised portions corresponding in position to the cuts,
    each of the raised portions having a sloped plate portion interposed between the cylindrical portion and the flat portion near the respective inner edges of the cuts, having a substantially U-shaped cross-section perpendicular to the radial direction of the booster shell, and opening towards the master cylinder.

4. The vacuum booster of claim 1, wherein each of the main reinforcing portions is formed in a sectorial shape, and is made large in arcuate length outwardly in the radial direction.

\* \* \* \* \*